United States Patent
Masaeli et al.

(10) Patent No.: US 10,843,196 B2
(45) Date of Patent: Nov. 24, 2020

(54) SYSTEMS AND METHODS FOR AUTOMATED SINGLE CELL CYTOLOGICAL CLASSIFICATION IN FLOW

(71) Applicant: The Board of Trustees of the Leland Stanford Junior University, Stanford, CA (US)

(72) Inventors: Mahdokht Masaeli, San Jose, CA (US); Euan A. Ashley, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 15/600,618

(22) Filed: May 19, 2017

(65) Prior Publication Data

US 2017/0333902 A1    Nov. 23, 2017

Related U.S. Application Data

(60) Provisional application No. 62/339,051, filed on May 19, 2016.

(51) Int. Cl.
*B01L 3/00* (2006.01)
*G01N 15/14* (2006.01)
*G01N 15/10* (2006.01)

(52) U.S. Cl.
CPC ..... *B01L 3/502761* (2013.01); *B01L 3/50273* (2013.01); *B01L 3/502715* (2013.01);
(Continued)

(58) Field of Classification Search
None
See application file for complete search history.

(56) References Cited

U.S. PATENT DOCUMENTS 5,804,143 A    9/1998 Leary et al.
6,947,586 B2    9/2005 Kasdan et al.
(Continued)

FOREIGN PATENT DOCUMENTS

CN    109154601 A    1/2019
DE    102014205535 A1    10/2015
(Continued)

OTHER PUBLICATIONS

Zheng et al., Hydrodynamically controlled cell rotation in an electroporation microchip to circumferentially deliver molecules into single cells, published online, Jan. 7, 2016, Microfluid Nanofluid (2016/)20:16 (pp. 1-12).*

(Continued)

*Primary Examiner* — Kathryn Wright
(74) *Attorney, Agent, or Firm* — KPPB LLP

(57) ABSTRACT

Systems and methods in accordance with various embodiments of the invention are capable of rapid analysis and classification of cellular samples based on cytomorphological properties. In several embodiments, cells suspended in a fluid medium are passed through a microfluidic channel, where they are focused to a single stream line and imaged continuously. In a number of embodiments, the microfluidic channel establishes flow that enables individual cells to each be imaged at multiple angles in a short amount of time. A pattern recognition system can analyze the data captured from high-speed images of cells flowing through this system and classify target cells. In this way, the automated platform creates new possibilities for a wide range of research and clinical applications such as (but not limited to) point of care services.

22 Claims, 6 Drawing Sheets

(52) U.S. Cl.
CPC ..... *G01N 15/1404* (2013.01); *G01N 15/1434* (2013.01); *G01N 15/1484* (2013.01); *B01L 2200/027* (2013.01); *B01L 2200/0636* (2013.01); *B01L 2200/0652* (2013.01); *B01L 2300/0654* (2013.01); *B01L 2300/0681* (2013.01); *B01L 2300/0858* (2013.01); *B01L 2300/0877* (2013.01); *B01L 2300/0883* (2013.01); *B01L 2400/086* (2013.01); *G01N 2015/1006* (2013.01); *G01N 2015/144* (2013.01); *G01N 2015/1445* (2013.01)

(56) References Cited

U.S. PATENT DOCUMENTS

| | | | |
|---|---|---|---|
| 7,450,229 | B2 | 11/2008 | Ortyn et al. |
| 7,482,577 | B2* | 1/2009 | Gruber ............... G01N 15/1459 250/251 |
| 8,186,913 | B2 | 5/2012 | Toner et al. |
| 8,465,706 | B2* | 6/2013 | Attinger ............ B01L 3/502707 422/502 |
| 8,935,098 | B2 | 1/2015 | Di Carlo et al. |
| 9,328,344 | B2* | 5/2016 | Link ................... B01F 13/0071 |
| 2012/0058480 | A1 | 3/2012 | Lewis et al. |
| 2012/0063664 | A1 | 3/2012 | Di Carlo et al. |
| 2013/0130226 | A1* | 5/2013 | Lim ................... B01L 3/50273 435/2 |
| 2014/0071452 | A1 | 3/2014 | Fleischer |
| 2015/0087007 | A1 | 3/2015 | Meldrum et al. |
| 2016/0084750 | A1 | 3/2016 | Wang et al. |
| 2017/0052106 | A1 | 2/2017 | Hennig et al. |
| 2017/0248512 | A1 | 8/2017 | Di Carlo et al. |
| 2017/0333903 | A1 | 11/2017 | Masaeli et al. |
| 2017/0356914 | A1 | 12/2017 | Weichert et al. |
| 2018/0156710 | A1 | 6/2018 | Vrane |

FOREIGN PATENT DOCUMENTS

| | | | | |
|---|---|---|---|---|
| EP | 3458857 | A1 | 3/2019 | |
| GB | 2566847 | A | 3/2019 | |
| JP | 2019518448 | A | 7/2019 | |
| WO | WO-2016054293 | A1 * | 4/2016 | ........... G01N 15/147 |
| WO | 2017201495 | A1 | 11/2017 | |
| WO | 2017201546 | A1 | 11/2017 | |

OTHER PUBLICATIONS

International Preliminary Report on Patentability for International Application PCT/US2017/033676, Report issued Nov. 20, 2018, dated Nov. 29, 2018, 7 Pgs.

International Preliminary Report on Patentability for International Application PCT/US2017/033889, Report issued Nov. 20, 2018, dated Nov. 29, 2018, 8 Pgs.

International Search Report and Written Opinion for International Application No. PCT/US2017/033676, Search completed Jul. 22, 2017, dated Aug. 11, 2017, 11 Pgs.

International Search Report and Written Opinion for International Application No. PCT/US2017/033889, Search completed Jul. 26, 2017, dated Aug. 25, 2017, 9 Pgs.

Chen et al., "Deep Learning in Label-free Cell Classification", Scientific Reports, Mar. 15, 2016, vol. 6, Article 21471, 16 pgs.

Goda et al., "High-throughput single-microparticle imaging flow analyzer", Proceedings of the National Academy of Sciences (PNAS), Jul. 17, 2012, vol. 109, No. 29, pp. 11630-11635.

Zeng, "Microfluidic Investigation of the Mechanical Behavior of Red Blood Cells Entering a Constriction", University of California, Davis, ProQuest Dissertations Publishing, 2014, 115 pgs.

Extended European Search Report for European Application No. 17800306.7, Search completed Jun. 3, 2019, dated Jun. 12, 2019, 10 Pgs.

International Search Report and Written Opinion for International Application No. PCT/US2019/046557, Search completed Nov. 25, 2019, dated Dec. 13, 2019, 15 Pgs.

* cited by examiner

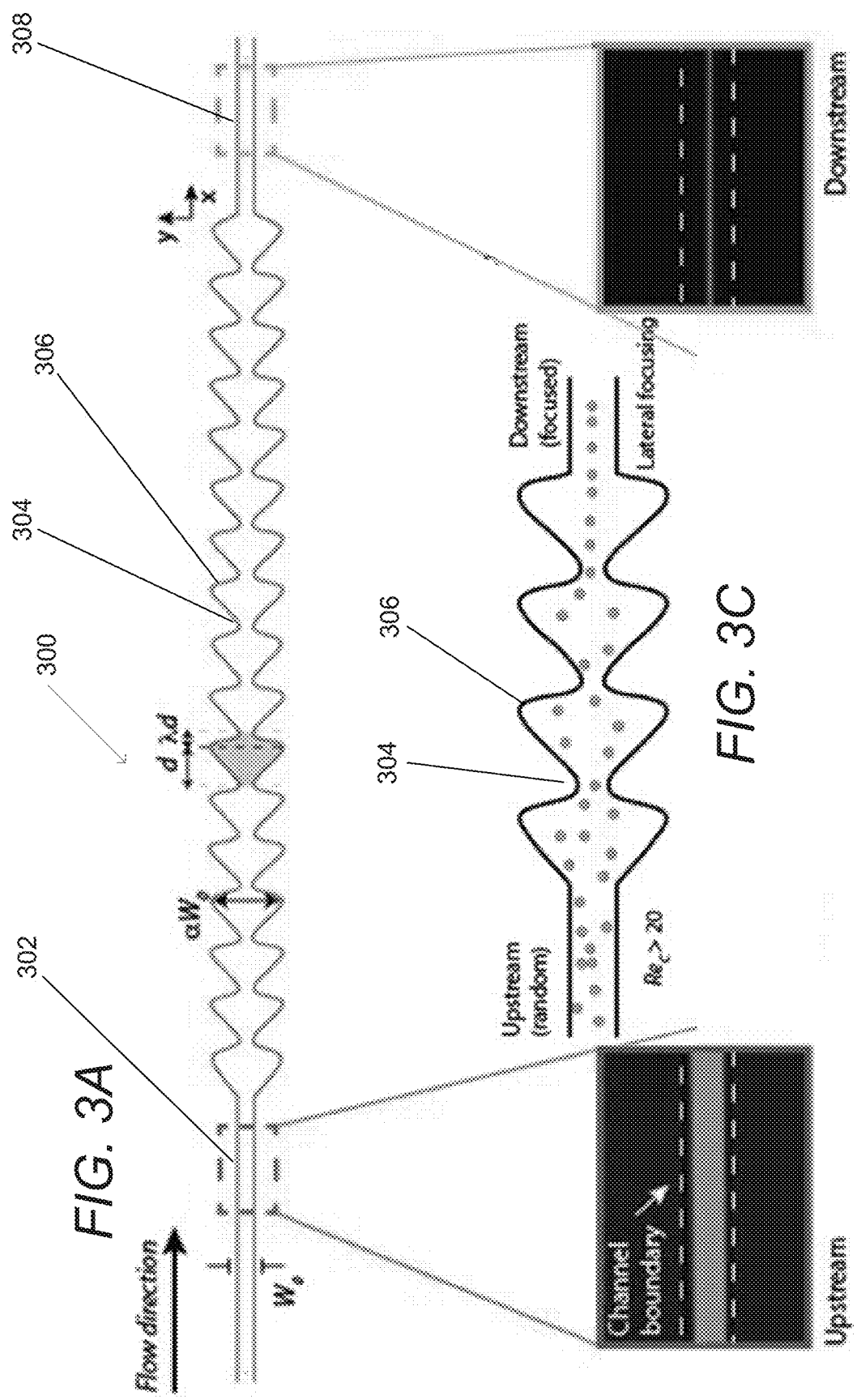

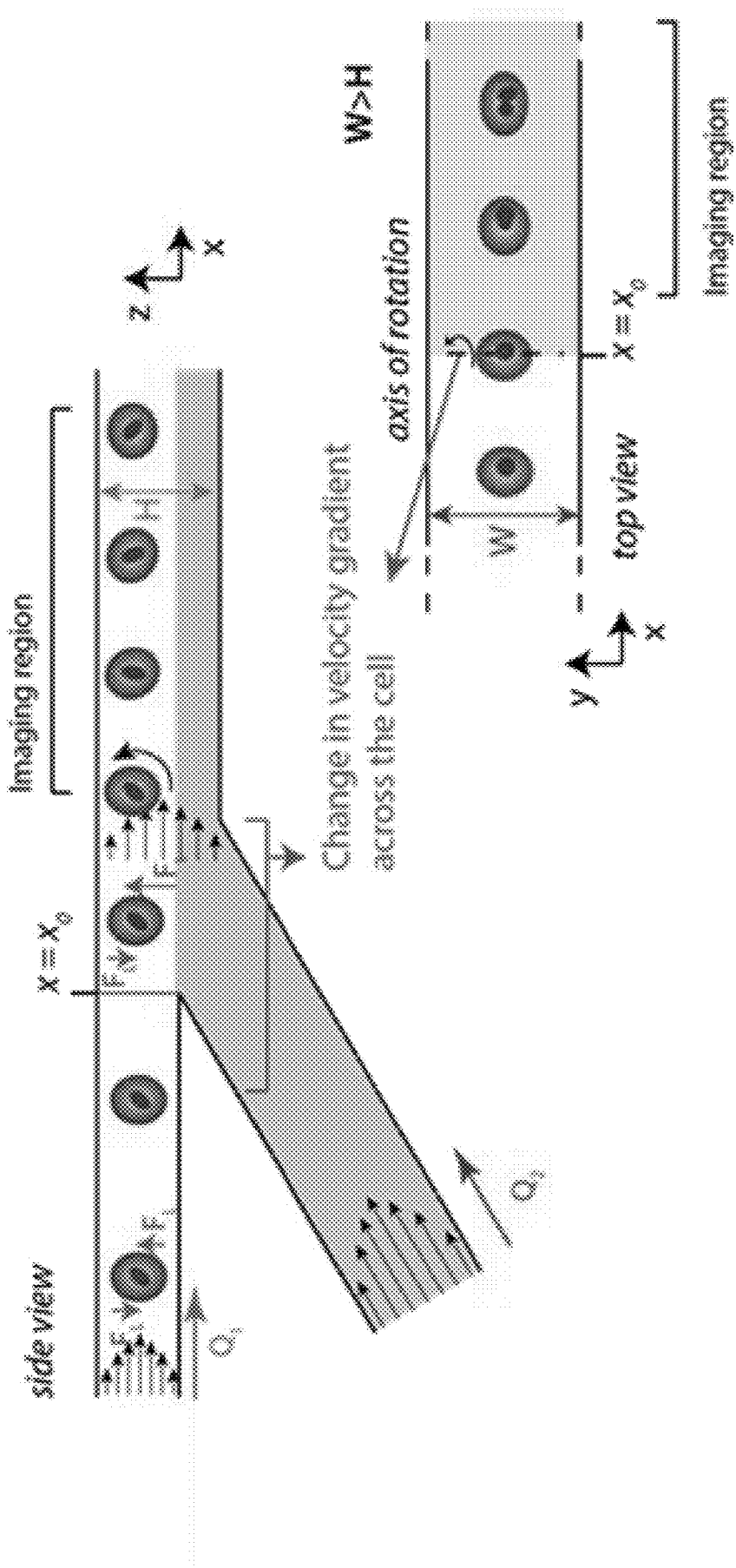

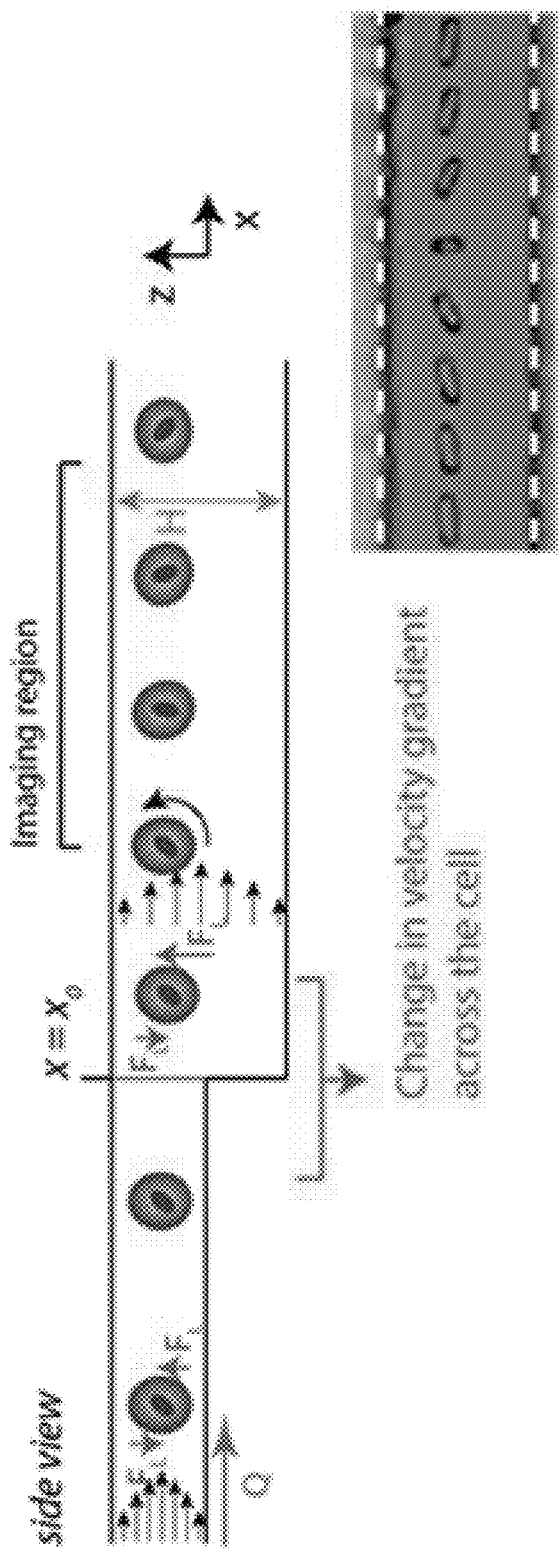

SYSTEMS AND METHODS FOR AUTOMATED SINGLE CELL CYTOLOGICAL CLASSIFICATION IN FLOW

CROSS-REFERENCE TO RELATED APPLICATIONS

The current application claims the benefit of and priority under 35 U.S.C. § 119(e) to U.S. Provisional Patent Application No. 62/339,051 entitled "Systems and Methods for Automated Single Cell Cytological Classification in Flow" to Masaeli et al., filed May 19, 2016. The disclosure of U.S. Provisional Patent Application No. 62/339,051 is hereby incorporated by reference in its entirety for all purposes.

FIELD OF THE INVENTION

The present application relates generally to the imaging of cells in flow and more specifically to automated high throughput single cell cytological classification in flow.

BACKGROUND

Cell physical and morphological properties have long been used to study cell type and cell state and to diagnose diseases. Cell shape is one of the markers of cell cycle. Eukaryotic cells show physical changes in shape which can be cell-cycle dependent, such as a yeast cell undergoing budding or fission. Shape is also an indicator of cell state and can become an indication used for clinical diagnostics. Blood cell shape may change due to many clinical conditions, diseases, and medications, such as the changes in red cells' morphologies resulting from parasitic infections. Other parameters such as features of cell membrane, nuclear-to-cytoplasm ratio, nuclear envelope morphology, and chromatin structure can also be used to identify cell type and disease state. In blood, for instance, different cell types are distinguished by factors such as cell size and nuclear shape.

Biologists and cytopathologists routinely use cell size and morphology to identify cell type and diagnose disease. This is mainly done by some sort of microscopic imaging and manual analysis of the images. As a result, the existing methods are time consuming, subjective, qualitative, and prone to error. Cytopathologists, for instance, review slides prepared from different tissues using a light microscope and look for features that resemble characteristics of disease. This process is timely and the results are subjective and impacted by the orientation of the stained cells, how the slide was prepared, and the expertise of the cytopathologist. Although there have been recent efforts to automate the analysis of cytology smears, there are still challenges. One of the main problems with the analysis of the smears is the existence of contaminant cells that are hard to avoid and make it difficult to detect rare cells or specific feature characteristics of disease. Other issues are the angles of the stained or smeared cells, which can obscure essential information for identification of a cell type or state.

SUMMARY OF THE INVENTION

Systems and methods for automated single cell cytological classification in flow in accordance with various embodiments of the invention are illustrated. One embodiment includes a cytological classification system including an imaging system, a flow cell including an inlet, an outlet, and a microfluidic channel including an imaging region, wherein the microfluidic channel receives flow via the inlet and having channel walls formed to focus cells from a sample into a single stream line, space cells within a single stream line, and rotate cells within a single stream line, and a perfusion system configured to inject a sample into the flow cell via the inlet.

In another embodiment, a sample injected into the flow cell includes a concentration of cells within the range of $1 \times 10^5$ cells/mL and $5 \times 10^5$ cells/m L.

In a further embodiment, a sample injected into the flow cell includes cells from the group consisting of fixed cells and cells stained with colored dyes.

In still another embodiment, the flow cell is implemented as a microfluidic device.

In a still further embodiment, the imaging system includes a light source configured to illuminate the imaging region of the microfluidic channel.

In yet another embodiment, the imaging system further includes an objective lens system configured to magnify the cells passing through the imaging region of the microfluidic channel.

In a yet further embodiment, the imaging system further includes a high-speed camera system configured to capture images at between 100,000 and 500,000 frames/s.

In another additional embodiment, the microfluidic channel is formed so that the imaging system captures a sequence of images of a rotating cell within the imaging region of the microfluidic channel that provides full 360° view of the cell.

In a further additional embodiment, the imaging system captures at least 10 images of a cell within the imaging region of the microfluidic channel.

In another embodiment again, the imaging system captures of images of at least 1000 cells/second and the computing system classifies at least 1000 cells/second.

In a further embodiment again, the microfluidic channel further includes a filtration region.

In still yet another embodiment, a subsection of the channel walls includes a focusing region formed to focus cells from a sample into a single stream line of cells using inertial lift forces.

In a still yet further embodiment, the inertial lift forces act on cells at Reynolds numbers where laminar flow occurs.

In still another additional embodiment, the focusing region includes contracted and expanded sections.

In a still further additional embodiment, the contracted and expanded sections have an asymmetrical periodic structure.

In still another embodiment again, a subsection of the channel walls includes an ordering region formed to space cells within a single stream line using inertial lift forces and secondary flows that exert drag forces on the cells.

In a still further embodiment again, the ordering region forms at least one pinching region.

In yet another additional embodiment, the ordering region forms a sequence of curved channels and pinching regions.

In a yet further additional embodiment, a subsection of the channel walls includes a cell rotation region formed to rotate cells by applying a velocity gradient to the cells within the single stream line of cells.

In yet another embodiment again, the cell rotation region applies a velocity gradient to cells using a co-flow.

In a yet further embodiment again, the cell rotation region applies a velocity gradient to cells by increasing at least one dimension of the channel.

In another additional embodiment again, the cytologoical classification system includes a two-layered flow cell including an inlet, an outlet, and a microfluidic channel including a focusing region for focusing cells from a sample into a single stream line, an ordering region for spacing cells within a single stream line, a cell rotation region for rotating cells within a single stream line, and an imaging region that provides a field of view of rotating cells, a perfusion system configured to inject a sample into the flow cell via the inlet, an imaging system including a camera configured to collect images of the imaging region a light source for illuminating the imaging region, and an objective lens system configured to provide magnification of the imaging region, and a computing system configured to receive images from the imaging system and to analyze the received images.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 3A conceptually illustrates a focusing region of a flow cell in accordance with an embodiment of the invention.

FIGS. 3B-3D conceptually illustrate an upstream section, contracting and expanding sections, and a downstream section of a focusing region of a flow cell in accordance with an embodiment of the invention.

FIGS. 5A and 5B conceptually illustrate a cell rotation region of a flow cell utilizing co-flow in accordance with an embodiment of the invention.

FIG. 5C conceptually illustrates a cell rotation region of a flow cell utilizing a change in channel dimensions in accordance with an embodiment of the invention.

FIG. 5D is an overlay image of a video of a rotating particle in a cell rotation region of a flow cell in accordance with an embodiment of the invention.

DETAILED DESCRIPTION

Systems and methods in accordance with various embodiments of the invention are capable of rapid analysis and classification of cellular samples based on cytomorphological properties. In several embodiments, cells suspended in a fluid medium are passed through a microfluidic channel, where they are focused to a single stream line and imaged continuously. In a number of embodiments, the microfluidic channel establishes flow that enables individual cells to each be imaged at multiple angles in a short amount of time. A pattern recognition system can analyze the data captured from high-speed images of cells flowing through this system and classify target cells. In this way, the automated platform creates new possibilities for a wide range of research and clinical applications such as (but not limited to) point of care services.

Systems and methods in accordance with a number of embodiments of the invention utilize inertial lift forces in a miniaturized fluidic device to position cells in flow and to transfer cells to a single lateral position. The cells can then be ordered to prevent arrival of multiple cells in a single frame during imaging. In this way, the need for image segmentation can be avoided. In a number of embodiments, the cells are caused to spin while they are imaged to capture images of individual cells at multiple angles.

In many embodiments, the cytological classification system can detect and track cells as they pass through the microfluidic system, capturing multiple images per cell at different angles. In several embodiments, the system can be easily integrated with other miniaturized platforms to automate staining and eliminate manual sample preparation altogether. In certain embodiments, the cytological classification system allows for classification of cells individually by ordering them at desired distances from each other. When the cells are imaged in this way, the cytological classification system can reconstruct three-dimensional images from the images of an imaged cell at different angles. Furthermore, analysis can be performed based upon characteristics of the imaged cells including (but not limited to) the morphology of the cytoplasm and nuclear envelope.

Cytological classification systems and methods for performing cytological classification in flow in accordance with various embodiments of the invention are discussed further below.

Cytological Classification Systems

Figures 1A, 1B:
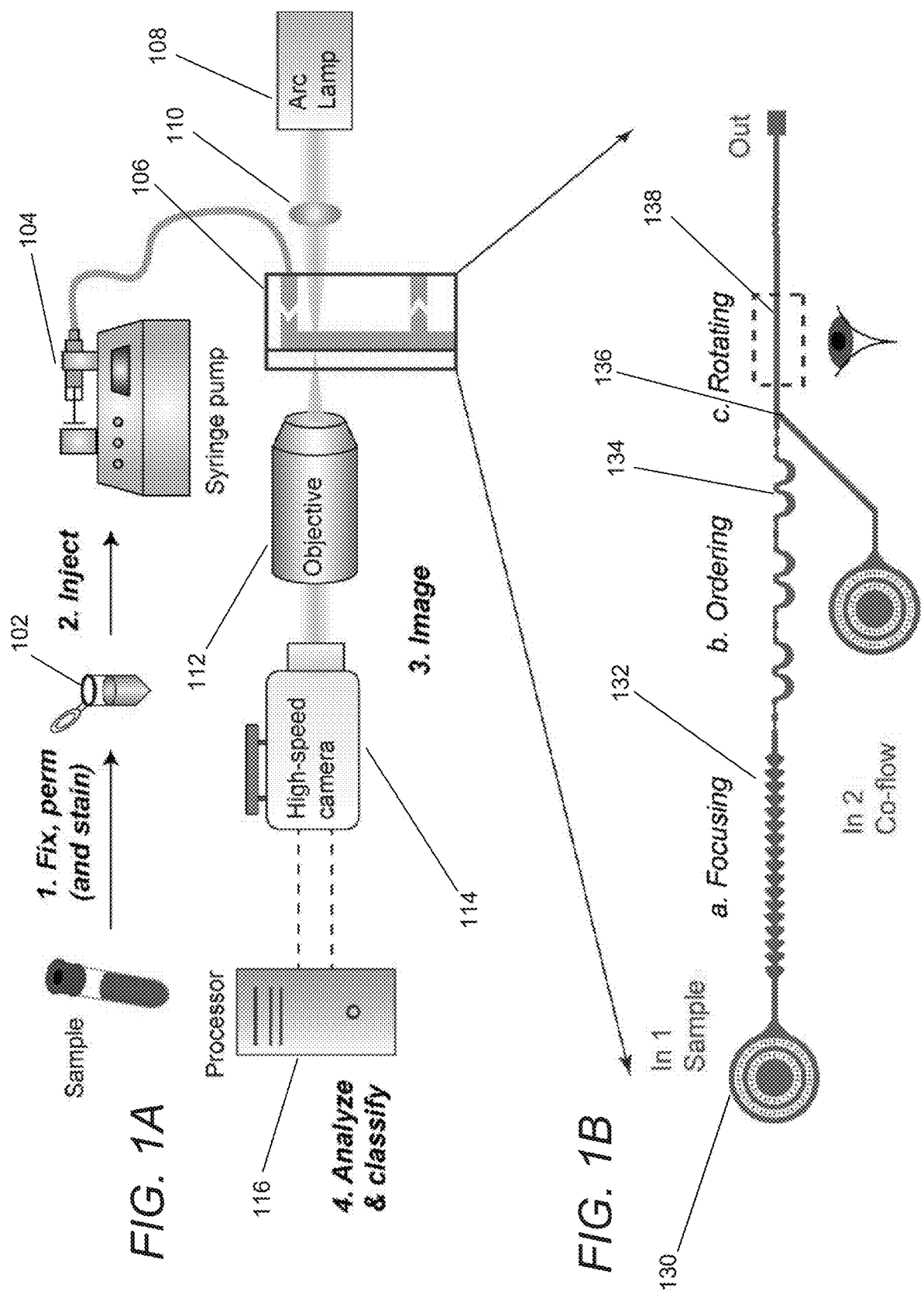
FIG. 1A conceptually illustrates a cytological classification system in accordance with an embodiment of the invention.
FIG. 1B conceptually illustrates a microfluidic design of a flow cell in accordance with an embodiment of the invention.

A cytological classification system in accordance with an embodiment of the invention is illustrated in FIG. 1A, with the microfluidic design shown in further detail in FIG. 1B. In operation, a sample 102 is prepared and injected by a syringe pump 104 into a flow cell 106, or flow-through device. In many embodiments, the flow cell 106 is a microfluidic device. Although FIG. 1A illustrates a cytological classification system utilizing a syringe pump, any of a number of perfusion systems can be used such as (but not limited to) gravity feeds, peristalsis, or any of a number of pressure systems. In many embodiments, the sample is prepared by fixation and staining. As can readily be appreciated, the specific manner in which the sample is prepared is largely dependent upon the requirements of a specific application.

In several embodiments, a cell suspension sample is prepared at concentrations ranging between $1 \times 10^5$-$5 \times 10^5$ cells/mL. The specific concentration utilized in a given cytological classification system typically depends upon the capabilities of the system. Cells may be fixed and stained with colored dyes (e.g., Papanicolaou and Wright Giemsa methods). Cytological classification systems in accordance with various embodiments of the invention can operate with live, fixed and/or Wright Giemsa-stained cells. Staining can help increase the contrast of nuclear organelles and improve classification accuracy. After preparation, the cell suspension sample can be injected into the microfluidic device using a conduit such as (but not limited to) tubing and a perfusion system such as (but not limited to) a syringe pump.

In many embodiments, a syringe pump injects the sample at ~100 μL/min. As can readily be appreciated, any perfusion system, such as (but not limited to) peristalsis systems and gravity feeds, appropriate to a given cytological classification system can be utilized.

As noted above, the flow cell 106 can be implemented as a fluidic device that focuses cells from the sample into a single stream line that is imaged continuously. In the illustrated embodiment, the cell line is illuminated by a light source 108 and an optical system 110 that directs light onto an imaging region 138 of the flow cell 106. An objective lens system 112 magnifies the cells by directing light toward the sensor of a high-speed camera system 114. In certain embodiments, a 40×, 60×, or 100× objective is used to magnify the cells. As can readily be appreciated by a person having ordinary skill in the art, the specific magnification utilized can vary greatly and is largely dependent upon the requirements of a given imaging system and cell types of interest.

In a number of embodiments, image sequences from cells are recorded at rates of between 100,000-500,000 frames/s using a high-speed camera, which may be color, monochrome, and/or imaged using any of a variety of imaging modalities including (but not limited to) the near-infrared spectrum. In the illustrated embodiment, the imaging area is illuminated with a high-power LED with exposure times of <1 μs to help prevent motion blurring of cells. As can readily be appreciated, the exposure times can differ across different systems and can largely be dependent upon the requirements of a given application or the limitations of a given system such as but not limited to flow rates. Images are acquired and can be analyzed using an image analysis algorithm. In many embodiments, the images are acquired and analyzed post-capture. In other embodiments, the images are acquired and analyzed in real-time continuously. Using object tracking software, single cells can be detected and tracked while in the field of view of the camera. Background subtraction can then be performed. In a number of embodiments, the flow cell 106 causes the cells to rotate as they are imaged and multiple images of each cell are provided to a computing system 116 for analysis. The flow rate and channel dimensions can be determined to obtain multiple images of the same cell and full 360° view of the cells (e.g. 4 images in which the cell rotates 90° between successive frames). A two-dimensional "hologram" of a cell can be generated by superimposing the multiple images of the individual cell. The "hologram" can be analyzed to automatically classify characteristics of the cell based upon features including (but not limited to) the morphological features of the cell. In many embodiments, 10 or more images are captured for each cell. As can readily be appreciated, the number of images that are captured is dependent upon the requirements of a given application.

In several embodiments, the flow cell has different regions to focus, order, and rotate cells. Although the focusing regions, ordering regions, and cell rotating regions are discussed as affecting the sample in a specific sequence, a person having ordinary skill in the art would appreciate that the various regions can be arranged differently, where the focusing, ordering, and rotating of the cells in the sample can be performed in any order. Regions within a microfluidic device implemented in accordance with an embodiment of the invention are illustrated in FIG. 1B. The flow cell 106 includes a filtration region 130 to prevent channel clogging by aggregates/debris or dust particles. Cells pass through a focusing region 132 that utilizes "inertial focusing" to form a single stream line of cells that are then spaced by an ordering region 134. Prior to imaging, rotation can be imparted upon the cells by a rotation region 136. The spinning cells can then pass through an imaging region 138 in which the cells are illuminated for imaging prior to exiting the flow cell. These various regions are described and discussed in further detail below.

As cytological classification systems in accordance with various embodiments of the invention deliver single cells for imaging, the systems eliminate the variability involved in manual preparation of slides, which rely on expertise of the operator. Furthermore, image segmentation can be avoided. As the cytological classification systems rely on inertial effects, relatively high flow rates and high-throughputs (e.g. analyzing >1000 cells/second) can be achieved. In many embodiments, the cytological classification system includes an imaging system that can capture images of at least 1000 cells/second and a computing system that can classify at least 1000 cells/second. The imaging system can include, among other things, a camera, an objective lens system and a light source. In a number of embodiments, flow cells similar to those described above can be fabricated using standard 2D microfluidic fabrication techniques, requiring minimal fabrication time and cost.

Although specific cytological classification systems, flow cells, and microfluidic devices are described above with respect to FIGS. 1A and 1B, cytological classification systems can be implemented in any of a variety of ways appropriate to the requirements of specific applications in accordance with various embodiments of the invention. Specific elements of microfluidic devices that can be utilized in cytological classification systems in accordance with many embodiments of the invention are discussed further below.

Microfludic Device Fabrication

Microfluidic devices in accordance with several embodiments of the invention can be fabricated using a variety of methods. In many embodiments, a combination of photolithography and mold casting is used to fabricate a microfluidic device. Conventional photlithography typically involves the use of photoresist and patterned light to create a mold containing a positive relief of the desired microfluidic pattern on top of a substrate, typically a silicon wafer. Photoresist is a photo-curable material that can be used in photolithography to create structures with feature sizes on the order of micrometers. During fabrication, the photoresist can be deposited onto a substrate. The substrate can be spun to create a layer of photoresist with a targeted desired height. The photoresist layer can then be exposed to light, typically UV light (depending on the type of photoresist), through a patterned mask to create a cured pattern of photoresist. The remaining uncured portions can be developed away, leaving behind a positive relief mold that can be used to fabricate microfluidic devices.

From the mold, material can be cast to create a layer containing a negative relief pattern. Inlet and outlet holes can be formed at appropriate regions, and the device can then be bonded to a backing to create a flow-through device, or flow cell, with microfluidic channels. In many embodiments utilizing a rotation section, a two-layer fabrication process can be used to orient the rotation section so that imaging of the cells as they rotate will provide images of cells at different angles with a more accurate representation of cellular features. As can be readily appreciated, the microfluidic device can be fabricated using a variety of materials as appropriate to the requirements of the given application. In imaging applications, the microfluidic device is typically made of an optically transparent material such as (but not limited to) polydimethylsiloxane ("PDMS").

Although a specific method of microfluidic device fabrication is discussed, any of a variety of methods can be implemented to fabricate a microfluidic device utilized in accordance with various embodiments of the invention as appropriate to the requirements of a given application.

Microfludic Filters

Figure 2:
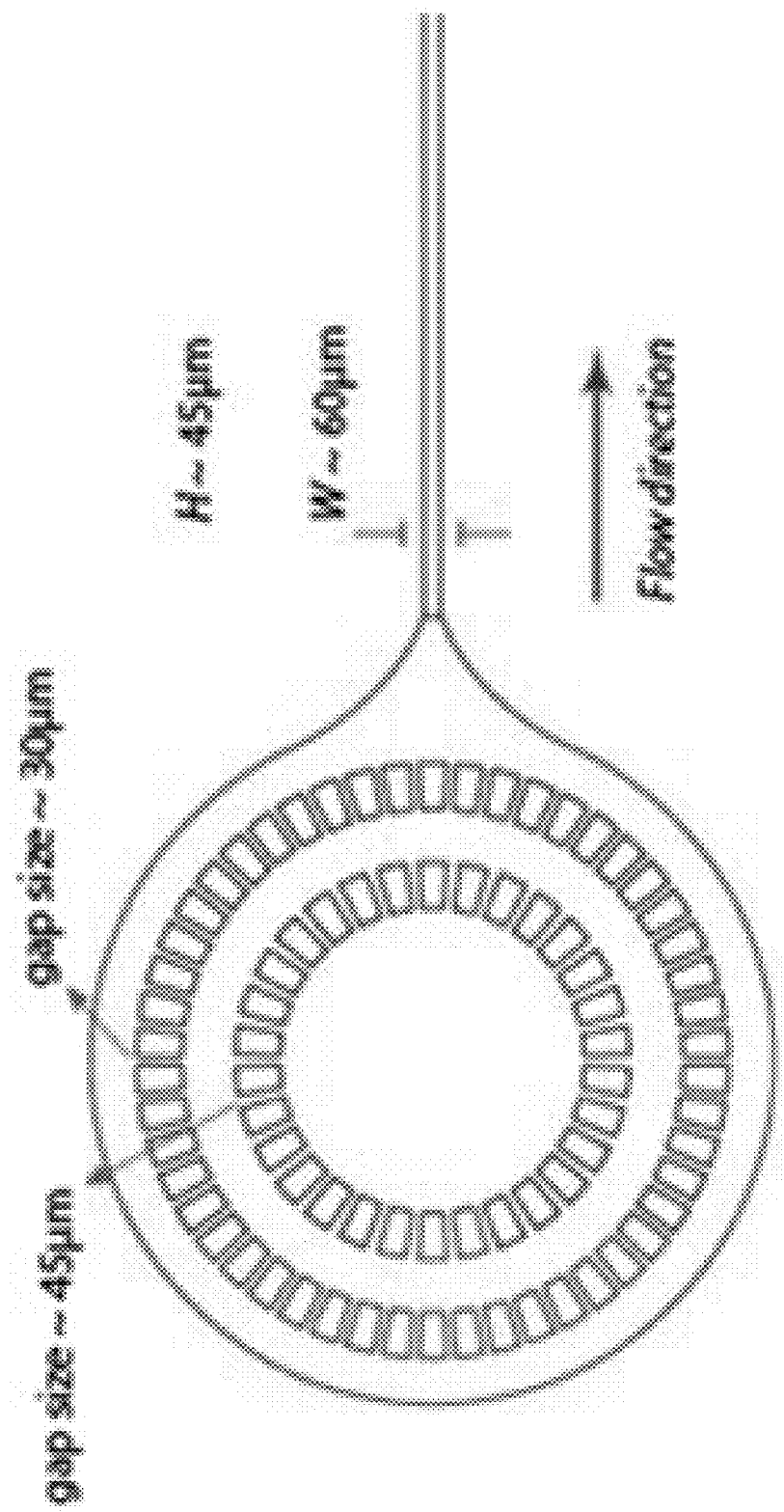
FIG. 2 conceptually illustrates a filtration region of a flow cell in accordance with an embodiment of the invention.

Microfluidic devices in accordance with several embodiments of the invention can include one or more microfluidic filters at the inlets, or further down, of the microfluidic device to prevent channel clogging. In other embodiments, filtration can occur off device. A microfluidic filter system in accordance with an embodiment of the invention is illustrated in FIG. 2 and includes two layers of microfluidic filters located at the inlet of a microfluidic device to prevent channel clogging by aggregates/debris or dust particles. In the illustrated embodiment, the microfluidic filter is implemented as a ring of structures spread out with specific sized gaps to filter out particles above a certain size. While specific dimensions and patterns of the filters and microfluidic channels are illustrated, the specific dimensions and patterns of the filters and the microfluidic channel can vary and are largely dependent upon the sizes of the cells of interest and the requirements of a given application.

Although a specific microfluidic filter system is illustrated in FIG. 2, any of a variety of microfluidic filter systems can be implemented on microfluidic devices utilized in accordance with various embodiments of the invention as appropriate to the requirements of a given flow application.

Focusing Regions

Focusing regions on a microfluidic device can take a disorderly stream of cells and utilize inertial lift forces (wall effect and shear gradient forces) to focus the cells within the flow into a single line of cells. FIG. 3A illustrates a focusing region 300 of a microfluidic channel in accordance with an embodiment of the invention. An upstream section 302, contracting 304 and expanding 306 sections, and a downstream section 308 are shown in additional detail in FIGS. 3B-3D.

The focusing region 300 receives a flow of randomly arranged cells via an upstream section 302. The cells flow into a region of contracted 304 and expanded 306 sections in which the randomly arranged cells are focused into a single stream line of cells. The focusing is driven by the action of inertial lift forces (wall effect and shear gradient forces) acting on cells at Reynolds numbers>1, where channel Reynolds number is defined as follows: $Re_c = \rho U_m W/\mu$, where $U_m$ is the maximum fluid velocity, $\rho$ is the fluid density, $\mu$ is the fluid viscosity, and W is the channel dimension. In some embodiments, Reynolds numbers around 20-30 can be used to focus particles ~10-20 μm. In many embodiments, the Reynolds number is such that laminar flow occurs within the microfluidic channels. As can readily be appreciated, the specific channel Reynolds number can vary and is largely determined by the characteristics of the cells for which the microfluidic device is designed, the dimensions of the microfluidic channels, and the flow rate controlled by the perfusion system.

In many embodiments, the focusing region is formed with curvilinear walls that forms periodic patterns. In some embodiments, the patterns form a series of square expansions and contractions. In other embodiments, the patterns are sinusoidal. In further embodiments, the sinusoidal patterns are skewed to form an asymmetric pattern. The focusing region illustrated in FIGS. 3A-3D can be effective in focusing cells over a wide range of flow rates. In the illustrated embodiment, an asymmetrical sinusoidal-like structure is used as opposed to square expansions and contractions. This helps prevent the formation of secondary vortices and secondary flows behind the particle flow stream. In this way, the illustrated structure allows for faster and more accurate focusing of cells to a single lateral equilibrium position. Spiral and curved channels can also be used in an inertia regime; however, these can complicate the integration with other modules. Finally, straight channels where channel width is greater than channel height can also be used for focusing cells onto single lateral position. However, in this case, since there will be more than one equilibrium position in the z-plane, imaging can become problematic, as the imaging focal plane is preferably fixed. As can readily be appreciated, any of a variety of structures that provide a cross section that expands and contracts along the length of the microfluidic channel or are capable of focusing the cells can be utilized as appropriate to the requirements of specific applications.

While specific implementations of focusing regions within microfluidic channels are described above with reference to FIGS. 3A-3D, any of a variety of channel configurations that focus cells into a single stream line can be utilized as appropriate to the requirements of a specific application in accordance with various embodiments of the invention.

Ordering Regions

Microfluidic channels can be designed to impose ordering upon a single stream line of cells formed by a focusing region in accordance with several embodiments of the invention. Microfluidic channels in accordance with many embodiments of the invention include an ordering region having pinching regions and curved channels. The ordering region orders the cells and distances single cells from each other to facilitate imaging. In a number of embodiments, ordering is achieved by forming the microfluidic channel to apply inertial lift forces and Dean drag forces on the cells. Dean flow is the rotational flow caused by fluid inertia. The microfluidic channel can be formed to create secondary flows that apply a Dean drag force proportional to the velocity of the secondary flows. Dean drag force scales with $\sim \rho U_m^2 \alpha D_h^2/R$, where $\rho$ is the fluid density, $U_m$ is the maximum fluid velocity, $$D_h = \frac{2WH}{W+H}$$

is the channel hydraulic diameter, $\alpha$ is the particle dimension, and R is the curvature radius. The force balance between inertial lift and Dean drag forces determines particle equilibrium position.

Figure 4A:
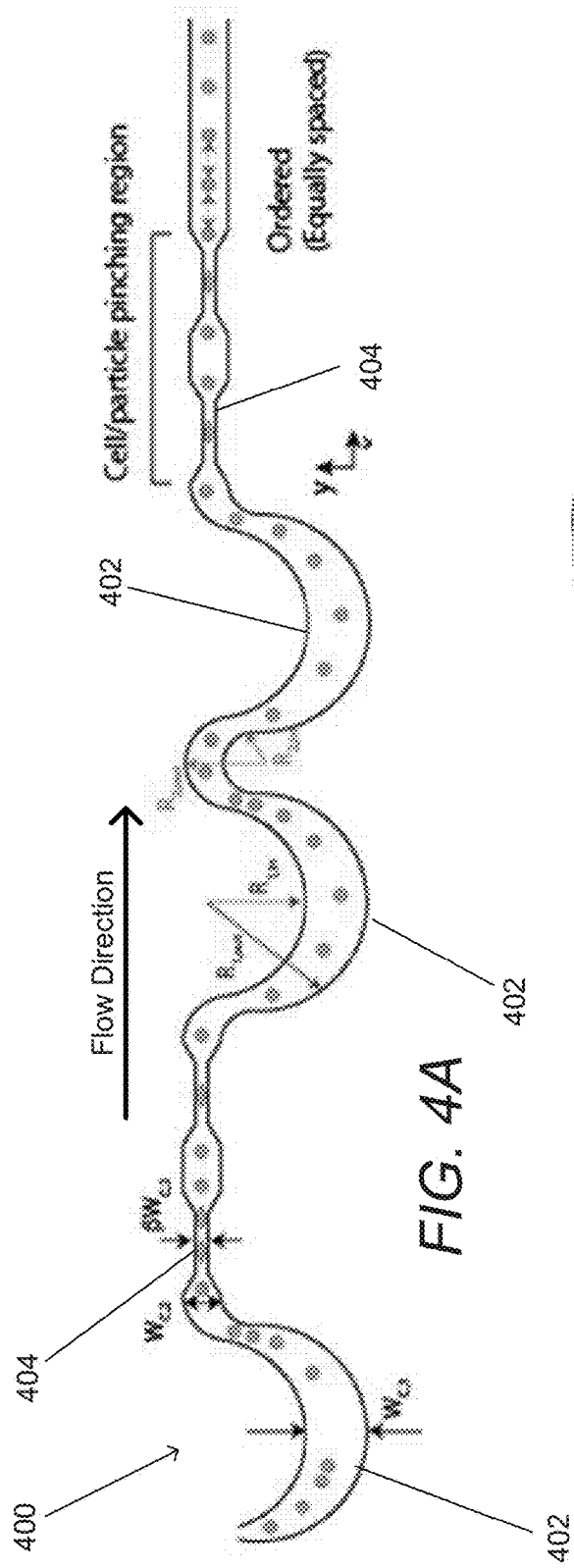
FIG. 4A conceptually illustrates an ordering region of a flow cell in accordance with an embodiment of the invention.
Figure 4B:
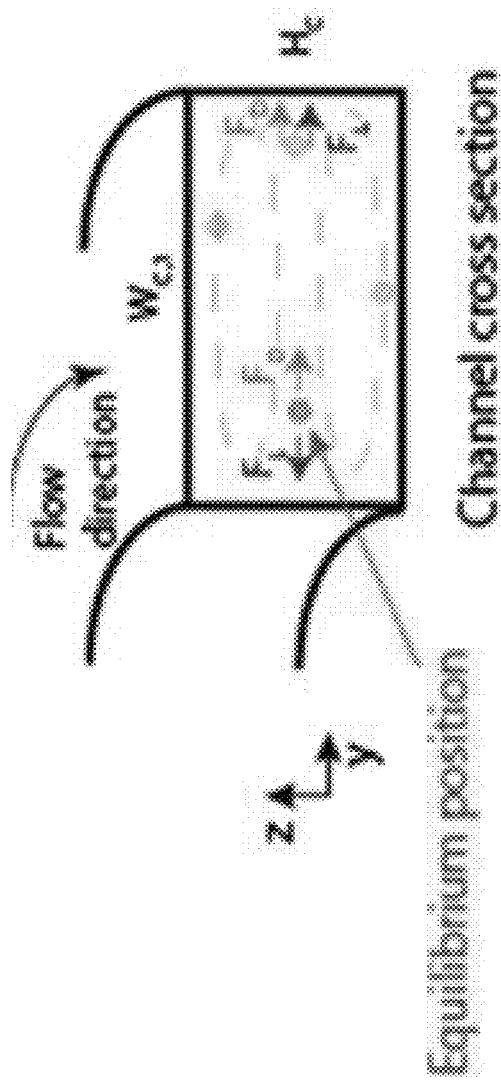
FIG. 4B conceptually illustrates the fluid dynamics within a channel cross section of an ordering region of a flow cell in accordance with an embodiment of the invention.

FIGS. 4A and 4B illustrate an ordering region 400 of a microfluidic channel having a sequence of curved channels 402 and pinching regions 404 in accordance with an embodiment of the invention. Depending on the particle size, the relative interior and exterior radii of curvature ($R_{1in,out}$) of the channel and channel height ($H_C$) of the microfluidic channel can be determined to reach equilibrium at desired locations. Different combinations of curved 402 and pinching regions 404 (and their parameters) can be used to achieve desired distance between particles. Channel width in the pinching region can be adjusted such that the cells will not be squeezed through the channels, causing possible damage to the cell membrane (the cells can, however, be slightly deformed without touching the channel walls while traveling through the pinching regions). Additionally, the squeezing could cause debris/residues from cell membrane left on the channel walls, which will change the properties of the channel. The ordering in the pinching regions is driven by instantaneous change in channel fluidic resistance upon arrival of a cell/particle. Since the channel width in this region is close to cell/particle dimensions, when a cell arrives at the pinching region, the channel resistance increases. Since the whole system is pressure-regulated (constant pressure), this can cause an instantaneous decrease in flow rate and therefore spacing of the cells. The length and width of pinching region can be adjusted to reach desired spacing between cells. The curved channel structure can also help with focusing cells to a single z position, facilitating imaging. The impact of Dean flow and inertial lift within the channel is conceptually illustrated in FIG. 4B.

Although a specific combination of curved channels and particle pinching regions that order and control the spacing between cells are illustrated in FIGS. 4A and 4B, different geometries, orders, and/or combinations can be used. In other embodiments, pinching regions can be placed downstream from the focusing channels without the use of curved channels. Adding the curved channels helps with more rapid and controlled ordering, as well as increasing the likelihood that particles follow a single lateral position as they migrate downstream. As can readily be appreciated, the specific configuration of an ordering region is largely determined based upon the requirements of a given application.

Cell Rotation Regions

Microfluidic channels can be configured to impart rotation on ordered cells in accordance with a number of embodiments of the invention. Cell rotation regions of microfluidic channels in accordance with many embodiments of the invention use co-flow of a particle-free buffer to induce cell rotation by using the co-flow to apply differential velocity gradients across the cells. In several embodiments, the cell rotation region of the microfluidic channel is fabricated using a two-layer fabrication process so that the axis of rotation is perpendicular to the axis of cell downstream migration and parallel to cell lateral migration. Cells are imaged in this region while tumbling and rotating as they migrate downstream. This allows for the imaging of a cell at different angles, which provides more accurate information concerning cellular features than can be captured in a single image or a sequence of images of a cell that is not rotating to any significant extent. This also allows for a 3D reconstruction of the cell using available software since the angles of rotation across the images are known. In many embodiments, a similar change in velocity gradient across the cell is achieved by providing a change in channel height (i.e. the dimension that is the smaller of the two dimensions of the cross section of the microfluidic channel and the dimension perpendicular to the imaging plane). This increase in channel height should be such that the width continues to be greater than the height of the channel. Also in the case of increasing channel height, there can be a shift in cell focusing position in the height dimension, which should be accounted for during imaging and adjustment of the imaging focal plane.

A cell rotation region of a microfluidic channel incorporating an injected co-flow prior to an imaging region in accordance with an embodiment of the invention is illustrated in FIGS. 5A and 5B. In the illustrated embodiment, co-flow is introduced in the z plane (perpendicular to the imaging plane) to spin the cells. Since the imaging is done in the x-y plane, rotation of cells around an axis parallel to the y-axis provides additional information by rotating portions of the cell that may have been occluded in previous images into view in each subsequent image. Due to a change in channel dimensions, at point $x_0$, a velocity gradient is applied across the cells, which can cause the cells to spin. The angular velocity of the cells depends on channel and cell dimensions and the ratio between Q1 (main channel flow rate) and Q2 (co-flow flow rate) and can be configured as appropriate to the requirements of a given application. In many embodiments, a cell rotation region incorporates an increase in one dimension of the microfluidic channel to initiate a change in the velocity gradient across a cell to impart rotation onto the cell. A cell rotation region of a microfluidic channel incorporating an increase in the z-axis dimension of the cross section of the microfluidic channel prior to an imaging region in accordance with an embodiment of the invention is illustrated in FIG. 5C. The change in channel height can initiate a change in velocity gradient across the cell in the z axis of the microfluidic channel, which can cause the cells to rotate as with using co-flow in FIGS. 5A and 5B. An overlay image of a video from a rotating rod-shaped particle captured within an imaging region of a microfluidic channel incorporating a cell rotation region similar to the cell rotation region illustrated in FIG. 5C is shown in FIG. 5D.

Although specific techniques for imparting velocity gradients upon cells are described above with reference to FIGS. 5A-5D, any of a variety of techniques can be utilized to impart rotation on a single stream line of cells as appropriate to the requirements of specific applications in accordance with various embodiments of the inventions.

Imaging and Classification

A variety of techniques can be utilized to classify images of cells captured by cytological classification systems in accordance with various embodiments of the invention. In a number of embodiments, images are captured at very high frame rates on the order of 100,000s of frames per second and classification is performed in real time. Since cells in the blood have distinct morphological properties, the ability to image individual cells from different angles using cytological classification systems in accordance with various embodiments of the invention means that a wide variety of classifiers can be developed to identify different cell types in blood and/or other applications. Using image analysis software, the different cell types can be classified.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A cytological classification system comprising:
   a flow cell comprising:
   an inlet;
   an outlet; and
   a microfluidic channel in fluid communication with and between the inlet and the outlet, wherein the microfluidic channel comprises:
   a focusing region for focusing cells from a sample into a single stream line having a plurality of contracted and a plurality of expanded sections along a longitudinal axis of the focusing region, wherein at least a portion of walls of the focusing region (i) contract symmetrically along the longitudinal axis to form the plurality of contracted sections and (ii) diverge symmetrically along the longitudinal axis to form the plurality of expanded sections, wherein the contracted and expanded sections form a skewed sinusoidal pattern;

an ordering region for spacing the cells within the single stream line;

a cell rotation region for rotating the cells within the single stream line by applying a velocity gradient to the cells within the single stream line; and an imaging region that provides a field of view of the rotating cells, wherein the microfluidic channel receives flow via the inlet;

a perfusion system configured to inject the sample into the flow cell via the inlet; and an imaging system comprising a camera configured to collect images of the imaging region.

2. The cytological classification system of claim 1, wherein a sample injected into the flow cell includes a concentration of cells within the range of $1\times10^5$ cells/mL and $5\times10^5$ cells/m L.

3. The cytological classification system of claim 1, wherein a sample injected into the flow cell includes cells from the group consisting of fixed cells and cells stained with colored dyes.

4. The cytological classification system of claim 1, wherein the flow cell is implemented as a microfluidic device.

5. The cytological classification system of claim 1, wherein the imaging system further comprises a light source configured to illuminate the imaging region of the microfluidic channel.

6. The cytological classification system of claim 5, wherein the imaging system further comprises an objective lens system operatively coupled to the camera and configured to magnify the cells passing through the imaging region of the microfluidic channel.

7. The cytological classification system of claim 5, wherein the camera comprises a high-speed camera configured to capture images at between 100,000 and 500,000 frames/s.

8. The cytological classification system of claim 1, wherein the microfluidic channel is formed so that the imaging system captures a sequence of images of a rotating cell within the imaging region of the microfluidic channel that provides full 360° views of the rotating cell.

9. The cytological classification system of claim 1, wherein the imaging system captures at least 10 images of a cell within the imaging region of the microfluidic channel.

10. The cytological classification system of claim 1, wherein the imaging system captures images of at least 1000 cells/second and the computing system classifies at least 1000 cells/second.

11. The cytological classification system of claim 1, wherein the microfluidic channel further comprises a filtration region.

12. The cytological classification system of claim 1, wherein the focusing region uses inertial lift forces to focus the cells from the sample into the single stream line.

13. The cytological classification system of claim 12, wherein the inertial lift forces act on the cells at Reynolds numbers of greater than one.

14. The cytological classification system of claim 1, wherein the at least the portion of walls have an asymmetrical periodic structure.

15. The cytological classification system of claim 1, wherein the ordering region uses inertial lift forces and secondary flows that exert drag forces on the cells to space the cells within the single stream line.

16. The cytological classification system of claim 15, wherein the ordering region forms at least one pinching region.

17. The cytological classification system of claim 15, wherein the ordering region forms a sequence of curved channels and pinching regions.

18. The cytological classification system of claim 17, wherein the sequence of curved channels and pinching regions achieves a desired distance between cells.

19. The cytological classification system of claim 17, wherein the pinching regions cause an instantaneous change in channel fluidic resistance upon arrival of a cell and a decrease in flow rate.

20. The cytological classification system of claim 1, wherein the cell rotation region applies a velocity gradient to the cells using a co-flow.

21. The cytological classification system of claim 1, wherein the cell rotation region applies a velocity gradient to cells by increasing at least one dimension of the microfluidic channel.

22. A cytological classification system comprising:
a two-layered flow cell comprising:
an inlet;
an outlet; and
a microfluidic channel in fluid communication with and between the inlet and the outlet, wherein the microfluidic channel comprises:
a focusing region for focusing cells from a sample into a single stream line having a plurality of contracted and a plurality of expanded sections along a longitudinal axis of the focusing region, wherein at least a portion of walls of the focusing region (i) contract symmetrically along the longitudinal axis to form the plurality of contracted sections and (ii) diverge symmetrically along the longitudinal axis to form the plurality of expanded sections, wherein the contracted and expanded sections form a skewed sinusoidal pattern;
an ordering region for spacing the cells within the single stream line;
a cell rotation region for rotating the cells within the single stream line by applying a velocity gradient to the cells within the single stream line; and
an imaging region that provides a field of view of the rotating cells,
a perfusion system configured to inject the sample into the two-layered flow cell via the inlet;
an imaging system comprising:
a camera configured to collect images of the imaging region;
a light source for illuminating the imaging region; and
an objective lens system operatively coupled to the camera and configured to provide magnification of the imaging region; and
a computing system configured to receive images from the imaging system and to analyze the received images.

* * * * *